Dec. 12, 1967  R. D. WINCHESTER ET AL  3,357,423

SURGICAL LIGHT PIPE AND THE LIKE

Filed March 26, 1965

3,357,423
SURGICAL LIGHT PIPE AND THE LIKE
Robert D. Winchester, Lynn, and Earl S. Carpenter, Lynnfield, Mass., assignors to Iota-Cam Corporation, Wakefield, Mass., a corporation of Massachusetts
Filed Mar. 26, 1965, Ser. No. 443,058
8 Claims. (Cl. 128—23)

ABSTRACT OF THE DISCLOSURE

Light pipe, e.g. for surgery, comprising light-conducting fibers, and three heat-resistant protective tubes. The first, adjacent the fibers, is pressure resistant and has annular conformations, second a braided metal tube of predetermined length, third a smooth outer-surface tube surrounding the braided tube. Rigid caps are sealed to the tubes, while fiber ends are bonded to the caps. The tubes limit bending of the light pipe.

Also a method including coiling outer tubes and inner fibers to cause fiber ends to extend outwardly, applying adhesives to the fiber ends and uncoiling to retract the fiber ends followed by curing.

---

This invention relates to steam-autoclavable, flexible light pipes and in particular to surgical light pipes suitable for illuminating wounds and incisions in hospital operating rooms.

No satisfactory autoclavable surgical light pipe has been available. It is true that in the past there have been surgical light pipes sold to the medical profession with advertised autoclavable properties, but these have not in fact been autoclavable, in the sense of being able to withstand repeated steam sterilization in an autoclave.

The need for a surgical autoclavable light pipe is very great. In surgical lighting, over-head lights, no matter how designed, present shadow problems to the surgeon. It is easy to comprehend the advantages that would result if there were light pipes available of suitable size and intensity permitting the operating room nurses to hold two or three within a few inches of the work, or insert them within deep incisions.

It is therefore a principal object of the invention to provide a satisfactory autoclavable surgical light pipe.

Another object, is more generally, to improve the construction of flexible light pipes, and in particular their durability and cost of manufacture.

Upon first impression the reader might believe that there should have been no problem in achieving an autoclavable surgical light pipe. Glass fiber technology has advanced to a considerably sophisticated, though still expensive, stage, in which a flexible bundle of fibers can be produced which will transmit considerable light.

But, as technicians in the art well know, the proper construction has been by no means obvious. This is because there exist a maze of interrelated and apparently conflicting problems that have required simultaneous solution. Though the solution presented herein may in retrospect seem simple, perhaps the reader will be able to grasp the significance of the invention by an outline of the problems, or one might say needs, of a surgical light pipe. These fall into a number of categories: criticality of diameter and flexibility, light transmitting ability, continued good light properties over a considerable life and ability to withstand autoclaving conditions.

There are severe limitations on light tube size. If two are to be located within 2 or 3 inches from the incision, along with the surgeon's knife and numerous other appliances, it becomes apparent that the light pipe must be small. Indeed, increase by only a small fraction of an inch in diameter can prevent a light pipe from being acceptable to surgeons. Another severe limitation arises from the fact that the nurse must be able to hold the light pipe for a very long time during an operation, which dictates flexibility and smallness in size.

There are equally severe requirements tending in the opposite direction with regard to size. For instance, with respect to light transmitting capability, in order to make use of light pipes worthwhile as an adjunct to over-head lighting they must improve considerably the already well lighted operating table. Accordingly each pipe must transmit a great amount of light, which dictates a large cross-sectional area. It will be appreciated that it would be too cumbersome and impractical to drape the operating table, in octopus fashion, with a large number of light tubes; hence the number that can be tolerated is limited to two or three.

The requirement for continuing good light properties also tends to dictate increase in cross-sectional size. The brittle (though to a degree flexible) fibers must be protected from breakage, and the optical surfaces at the ends of the light pipe must be preserved as broken fibers or marred optical surfaces will not transmit the needed light.

The means by which fiber breakage occurs include undue compression of the light pipe, as by stepping upon it, undue overall bending of the bundle, undue tension, and undue abrasion of the light pipe exterior.

Another means by which fibers break is that, although the overall bend of the bundle is not beyond a safe limit, still individual fibers, during a bend, tend to be forced into a longer than permissible path, resulting in tension beyond the breaking point. To combat this, cross-sectional space must be provided either for simply allowing the fibers to shift relative to one another, to prevent the path of any one from being forced to be too long, or for special configurations of the fibers for similarly counter-acting this tendency.

With regard to the optical surfaces, these are made by bonding the fibers together with epoxy cement, after which the excess length of the bundle is cut away and the surface is cut and polished to provide the optical surface.

The heat resistance of the epoxy at these bundle end regions very much depends upon the kind of cure it is given, and ordinarily, for a good cure, the entire mass of epoxy should be subject to constant temperature during cure.

The autoclaving conditions must be considered also. Satisfactory steam sterilization depend upon the type of surface being sterilized, much longer time being required for rough exterior surfaces than for smooth exterior surfaces, which further complicates the size problem.

The quality of the optical properties of prior light pipe have been severly affected by the autoclave conditions due to weakening of the epoxy. The temperature of the autoclave is generally 250°–300° F, near the practical limit even for cured epoxies, furthermore made rigorous by the autoclave saturated steam at a pressure between 25 and 40 p.s.i. When prior light pipes have been subjected to these conditions it has been found, that after a few uses, with repeated autoclaving in between, that the epoxy softens and flows outwardly, severely marring the optical surface. Furthermore, the light fibers have moved inward or outward, relative to the optical surfaces. depending for each fiber whether the configuration of the tube tended to cause the fiber to seek a longer or shorter path.

According to the present invention it has been found possible nevertheless to employ epoxy satisfactorily with the special combination of elements to be described.

According to the present invention it has been found that a near minmium-acceptable size of fiber bundle for a surgical light pipe is about 5/32 inch, as judged from light requirements.

According to the invention such a bundle is incorporated into a multiple tube construction which satisfies all of the other needs for autoclavable surgical light pipes, including in particular durable optical surfaces.

Figure 1:
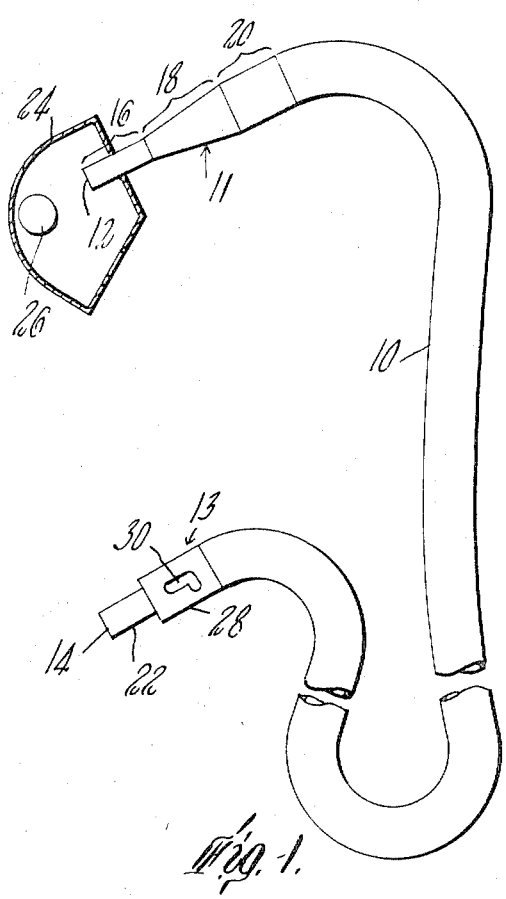
FIG. 1 is a view of a preferred autoclavable surgical light pipe acording to the invention.

Referring to FIG. 1 the light pipe comprises, overall, an elongated tubular construction 10 having an outer diameter of about 3/8 inch. Each end is provided with an optical surface 12, 14. The end of the light pipe adjacent optical surface 12 is specially shaped and enables a uniquely close location to the light source 24, 26, so that a number can be employed. This shape is defined by an end cap, preferably of metal, that has a first portion 16 of cylindrical form, immediately surrounding the bundle and strengthening it, to prevent fracture. The outer diameter of this portion can be 3/16 inch and it can be 1/2 inch long. This is followed by a second portion 18 which increases in strength by a gradual increase in cross sections, in the direction away from the optical surface 12. This section can be about 3/4 inch long with a final diameter of 3/8 inch. A third section 20, a cylinder of 3/8 inch diameter can extend for 1/2 inch and provide means for joining to the flexible tube. By this construction the final diameter is located a substantial distance from the optical surface, the diameter at the optical surface region is quite small, while the end unit as a whole is rigid and adequately supports and protests the fiber bundle.

The end cap of the opposite end is provided with a section 22 similar to section 16 and thus is sized so that it can be placed near the incision area. An enlarged section 28 of full diameter is provided with a female bayonet coupling 30 which serves to releasably join the unit to rigid light carriers, surgical appliances, etc.

Figure 2:
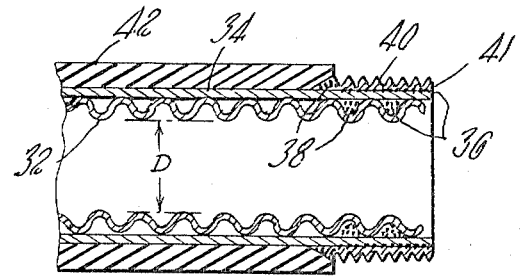
FIG. 2 is a cross-sectional view of a preferred sub-assembly of the light pipe of FIG. 1.

Referring to FIG. 2 the sheathing for the surgical light pipe contsitutes three different tubular members. The first is a flexible pressure resistant casing 32 which has annular configurations such as helical ribs or preferably corrugations forming annular rings. For this purpose conventional Monel metal bellows tubing is presently preferred. The tubing is selected with an internal bore D substantially larger than the diameter of the fiber bundle, for instance the bundle having 70 to 75% of the cross-sectional area of the bore, to permit individual shifting of the fibers to their desired path lengths.

Combined with this casing 32 is a second tubular casing 34, of braided metal, e.g. stainless steel, which is flexible, but inextensible beyond a predetermined length. These tubes are joined at corresponding end sections by solder 36 which fills the space between the two tubes and also the openings in the braided tube. Furthermore epoxy sealing material 38 is applied to fill in all pores and further assure air tightness.

To the outside of these portions of braided tube 34 is joined and sealed an adapter ring 40 which has an external thread. This ring is similarly joined and sealed by the combination of solder 36 and epoxy material 38.

Figure 3:
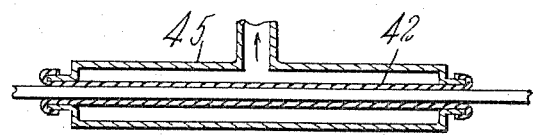
FIG. 3 is a view of a vacuum device being used in forming the sub-assembly of FIG. 2.
Figure 6:
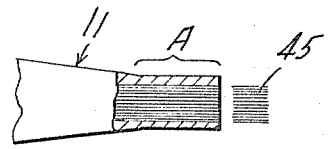
FIG. 6 is a cross-sectional view of a completed end portion of an autoclavable light pipe.

To the outside of braided tube 34 is also applied a flexible heat-resistant smooth tubular covering 42. preferably this tubing is of silicone rubber and is expanded by a conventional vacuum device 45 (FIG. 3), the braided tube sub-assembly inserted and then tube 42 is released, and tightly hugs the sub-assembly. Advantageously, the rubber tube 42 extends to a point immediately adjacent to the adapter ring 40.

Figure 4:
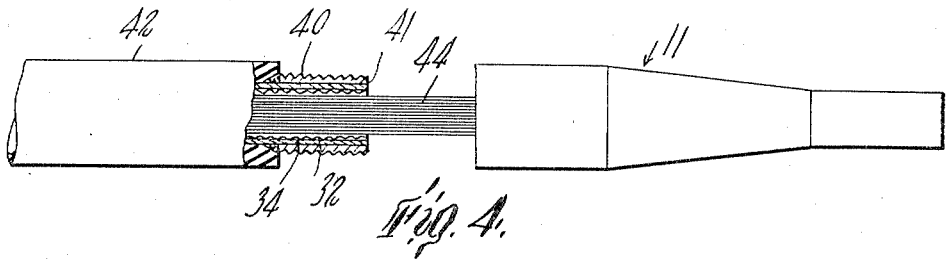
FIGS. 4 and 5 are side views, partially in cross-section, illustrating, respectively, the application of the end caps and the bonding of the fiber bundle, according to the invention, as steps in the manufacture of light pipes.

Referring to FIG. 4 the bundle of fibers 44 is inserted into the sub-assembly, and then the end caps 11 and 13 are screwed on. Elastomeric O rings are provided in the inside of the end caps 11 and 13, seated upon surface 15, and by threading on, the O ring is compressed against the side 41 of the adapter ring 40, thereby completing the sealed assembly from tip to tip, except for the region of the fibers.

Advantageously, to further supplement the seal, and also to avoid a soil-catching crevice which would require longer time in the autoclave, the threaded section 43 of each end cap is considerably longer than the threads of adapter 40, and extend therebeyond, engaging and forming threads in the exterior of the tubular rubber covering 42. Advantageously a sealing agent such as epoxy can be introduced between all matching threads.

It is advantageous to pressure test the structure during manufacture, to ensure that it can withstand at least 40 p.s.i. without developing leaks. All units that cannot should be rejected.

Figure 5:
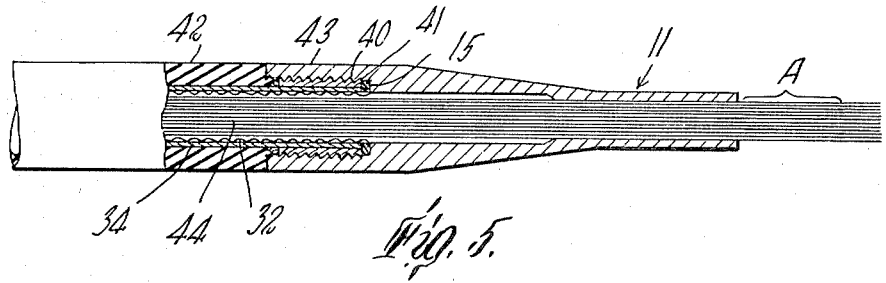

Next, the final seal is formed in the region of the fiber bundle. Advantageously, up to this point the fiber bundle is not solidified. The full assembly is forced into a coiled configuration to a smaller size than is permitted during use, and thereby, referring to FIG. 5, a section of bundle A which is normally confined by the end tips and tubes extends through the small opening from cylindrical sections 14, 16 at each end of the light pipe. To this protruding section an excess amount of epoxy is applied, with care being taken to fill all interstices. Thereupon the unit is uncoiled and the protruding sections A withdraw back into the unit in an extruding manner whereby the epoxy bonding material fills the interstices between adjacent fibers and the surrounding wall of the end cap.

The entire unit thus formed is inserted into a curing oven and held for instance at 275° F. for 2 hours while the epoxy cures. It will be noted that the ends of the fibers are directly exposed to the oven while the inner sections are shielded. Advantageously the length of the section A which is epoxied and withdrawn into the assembly is on the order of 1/2 inch.

After curing the assembly is removed, the excess fibers 45 are removed and the end face polished. It has been found that the grinding and polishing compounds, plus the working action has a favorable effect upon the interface itself in perfecting the seal and compensating for any shrinkage that may occur of the epoxy.

Thus there is produced an autoclavable light pipe.

For an example, the epoxy can be Tracon 2113 sold by Tracon, Incorporated, of Medford, Massachusetts.

While it is preferred to employ a metal bellows for tube 38, for instance of Monel metal, in some instances the tube may be of Teflon.

Needless to say, the autoclavable light pipe has other uses. Among these in the medical field is the use with instruments which internally inspect body cavities. For such uses other sizes may be desired. Where the high pressure and temperature resistant features are desired without need for sterility, it is possible to allow the braided metal tube to define the exterior surface.

In conclusion it is appropriate to comment upon some of the features of the present invention.

Prior to the invention the tendency of epoxy to fuse appeared critical, which would seem to dictate uniform heating during cure, heating all parts of each bond under the same conditions. However the present invention does not permit this, because only the outer end of the epoxied region of the fiber bundle is directly exposed to the oven, the fiber bundle resides inside its multiple protective walls at the time of curing, these walls act as insulation, and the hot air of the curing oven cannot penetrate the walls. But a more than compensating factor has been realized, in accordance with one aspect of the invention. The epoxy at the optical surface constitutes the final seal of a pressure casing. Thus, later when the unit is autoclaved, the pressure of the autoclave can only act inwardly on the optical surface, and this pressure acts just as much upon the fibers as on the epoxy. Thus there is no tendency for one to off-set from the other. On the other hand, with prior art light pipes, gas under 25–40 p.s.i. pressure could enter the inside of the pipe. This means, that in the autoclave steam would enter the pipe. Then being somewhat trapped, a relatively high pressure would remain in the light pipe when withdrawn from the autoclave to atmosphere. Thus the pressure on the outside of the bonded area would be substantially less than the pressure on the inside. Unlike the present invention, the pressure did not have a uniform action. The fibers extend continuously through the pipe, hence this pressure differential would not act upon them, but only upon the epoxy therebetween. This would tend to force the epoxy outwardly relative to the fibers. It is now believed that this pressure was a prime reason for the outward movement of the epoxy in prior light pipes, and that, by employing the present invention, the same, or indeed inferior bonds will provide optical surfaces that will not be marred.

Whether for these reasons alone or for others also inherent in the present construction although not appreciated, it is a fact that by not trying to improve what appeared to be the weakest link in the chain, the epoxy, we have achieved the result of circumventing the apparent epoxy problems. Furthermore, it is realized that the charatcer of the sheathing is all-important, and that a triple sheathing is of extreme importance, the inner tube providing crush resistance, pressure tightness and space for the fiber to shift, the middle tube providing a rugged cover that is inextensible lengthwise to prevent undue tension from being applied to fibers or inner tube and the outer tube providing a quickly autoclavable surface. It was found that such a cover offers so good protection to the fibers, that it is possible to use only the minimum number, without having to make allowance for substantial, individual breakage or for marring of a surface, and this in return allows the needs of flexibility to be realized in a surgical light pipe and other light pipes.

Numerous specific details can be varied within the spirit and scope of the invention.

What is claimed is:

1. A light pipe comprising, in combination, a bundle of flexible, transparent, light-conducting fibers, three heat-resistant protective tubular layers surrounding the length of said light pipe, said protective layers comprising a first pressure resistant, impermeable tube having annular conformations whereby said tube is flexible and crush-resistant, said first tube lying immediately adjacent said bundle of fibers, said first tube having an internal cross-sectional area substantially larger than said bundle, a second braided metal protective tube having a predetermined maximum length, said second tube surrounding said pressure resistant impermeable tube, and a third smooth outer-surface flexible tube surrounding said braided tube and providing a smooth surface to said light pipe, at each end of the light pipe a rigid cap secured thereto and sealed to said tubes, the ends of fibers of said fiber bundle bonded with bonding material, and each end of said fiber bundle bonded to the inside of the respective rigid cap, said light pipe being substantially leak-proof under steam pressure on the order of 25 p.s.i., preventing entry of steam to said fibers, said three tubes together constructed and arranged, relative to said fiber bundle, to limit bending thereof within the predetermined bend limit of said bundle.

2. The light pipe of claim 1 wherein said first tube comprises a metal pressure resistant tube of bellows-form axial cross-section, the end regions of said second braided metal tube soldered to corresponding end regions of said first tube, with solder filling openings in said braid, and a ring of epoxy material cooperating to join and seal said corresponding end region of said first and second tubes together.

3. The light pipe of claim 2 wherein exterior threaded adapter rings are soldered in place to the exterior of said end regions of said braided metal tube, and a ring of epoxy material cooperating to join and seal said ring and tube together, said rigid end caps provided with internal threads, and thereby joined to said adapter rings.

4. The light pipe of claim 3 wherein said third tube extends substantially to said adapter rings, the internal threaded portions of said end caps extending past said adapters and engaging the end regions of said tube, forming a seal therewith.

5. The light pipe of claim 3 wherein each of said end caps is provided with a resilient O ring, said O ring pressed between the side of said adapter ring and a cooperating seal surface of said end cap, sealing the two together.

6. The light pipe of claim 1 wherein said bonding-material comprises epoxy material which extends continuously from said fibers to the inside surface of said end caps forming the final seals for said light pipe.

7. A surgical light pipe comprising in combination, a bundle of flexible, transparent, light-conducting fibers of a diameter of about 5/32 inch, three heat-resistant protective tubular layers surrounding the length of said light pipe, said protective layers comprising a first pressure resistant, impermeable tube having annular conformations whereby said tube is flexible and crush-resistant, said first tube lying immediately adjacent said bundle of fibers, said first tube having an internal cross-sectional area substantially larger than said bundle, a second braided metal protective tube having a predetermined maximum length, said second tube surrounding said pressure resistant impermeable tube, and a third smooth outer-surface flexible tube surrounding said braided tube and providing a smooth surface to said light pipe, at each end of the light pipe a rigid cap secured thereto and sealed to said tubes, the ends of fibers of said fiber bundle bonded with epoxy bonding material, and each end of said fiber bundle bonded to the inside of the respective rigid cap, said light pipe being substantially leak-proof under steam pressure on the order of 25 p.s.i., preventing entry of steam to said fibers, said three tubes together constructed and arranged, relative to said fiber bundle, to limit bending thereof within the predetermined bend limit of said bundle, the outer diameter of said light pipe being about 3/8 inch.

8. The surgical light pipe or claim 7 wherein one of said end caps is specially shaped to be grouped with other similar units at a single light source, said end cap having a first, cylindrical end section of about 3/16 inch outer diameter extending along said bundle a distance of about 1/2 inch, a second, conical transition section increasing in diameter in the direction away from said end section, said transition section being about 3/4 inch long, and a third, cylindrical joint section having an outer diameter of about 3/8 inch, said joint section joined internally to said tubes.

References Cited

UNITED STATES PATENTS

| | | | |
|---|---|---|---|
| 2,932,294 | 4/1960 | Fourestier | 128—6 |
| 3,010,357 | 11/1961 | Hirschowitz | 128—6 XR |
| 3,131,690 | 5/1964 | Innis et al. | 128—23 |
| 3,132,646 | 5/1964 | Hett | 128—6 |
| 3,189,506 | 6/1965 | Cobb et al. | 156—296 |
| 3,285,242 | 11/1966 | Wallace | 128—23 |

RICHARD A. GAUDET, *Primary Examiner.*

K. L. HOWELL, *Assistant Examiner.*